United States Patent
Schneider et al.

(10) Patent No.: US 9,880,265 B2
(45) Date of Patent: Jan. 30, 2018

(54) OPTOELECTRONIC APPARATUS AND METHOD FOR THE DETECTION OF OBJECT INFORMATION

(71) Applicant: SICK AG, Waldkirch (DE)

(72) Inventors: Florian Schneider, Waldkirch (DE); Denise Bertz, Waldkirch (DE); Dirk Strohmeier, Waldkirch (DE)

(73) Assignee: SICK AG, Waldkirch (DE)

( * ) Notice: Subject to any disclaimer, the term of this patent is extended or adjusted under 35 U.S.C. 154(b) by 350 days.

(21) Appl. No.: 14/664,145

(22) Filed: Mar. 20, 2015

(65) Prior Publication Data
US 2015/0268333 A1  Sep. 24, 2015

(30) Foreign Application Priority Data
Mar. 24, 2014  (DE) .................. 10 2014 104 027

(51) Int. Cl.
| | |
|---|---|
| *G01S 7/48* | (2006.01) |
| *G01S 7/481* | (2006.01) |
| *G01S 17/08* | (2006.01) |
| *G02B 3/14* | (2006.01) |
| *G02B 26/00* | (2006.01) |
| *G06K 7/10* | (2006.01) |
| *G01S 17/88* | (2006.01) |
| *G01S 17/89* | (2006.01) |

(52) U.S. Cl.
CPC .......... *G01S 7/4816* (2013.01); *G01S 7/4817* (2013.01); *G01S 17/08* (2013.01); *G01S 17/88* (2013.01); *G01S 17/89* (2013.01); *G02B 3/14* (2013.01); *G02B 26/005* (2013.01); *G06K 7/10* (2013.01)

(58) Field of Classification Search
CPC ...... G01C 15/006; G01C 15/002; G02B 3/14; G02B 26/004; G02B 26/0875
See application file for complete search history.

(56) References Cited

U.S. PATENT DOCUMENTS 6,876,762 B1 * 4/2005 Ono .................. G06T 7/593
345/419
7,808,717 B2   10/2010 Kuiper et al.
(Continued)

FOREIGN PATENT DOCUMENTS

DE  102005015500 A1  10/2005
DE  202006017268 U1   4/2008
(Continued)

OTHER PUBLICATIONS

Office Action dated Mar. 24, 2015 for corresponding priority application No. 10 2014 104 027.9 (in German).

*Primary Examiner* — Luke D Ratcliffe
(74) *Attorney, Agent, or Firm* — Nath, Goldberg & Meyer; Jerald L. Meyer

(57) ABSTRACT

An optoelectronic apparatus (10) for the detection of object information from a monitored zone (12), comprising a light receiver (18), a receiving optics (16) associated with the light receiver (18), the receiving optics having an adaptive lens (26) with variable tilt, and an evaluation unit (20) for the generation of object information from a received signal of the light receiver (18) is provided. In this respect the evaluation unit (20) is configured to bring the adaptive lens (26) into a plurality of different tilt positions and to thereby obtain additional object information from an enlarged monitored zone (12).

9 Claims, 2 Drawing Sheets

(56) References Cited

U.S. PATENT DOCUMENTS

Figure 1:
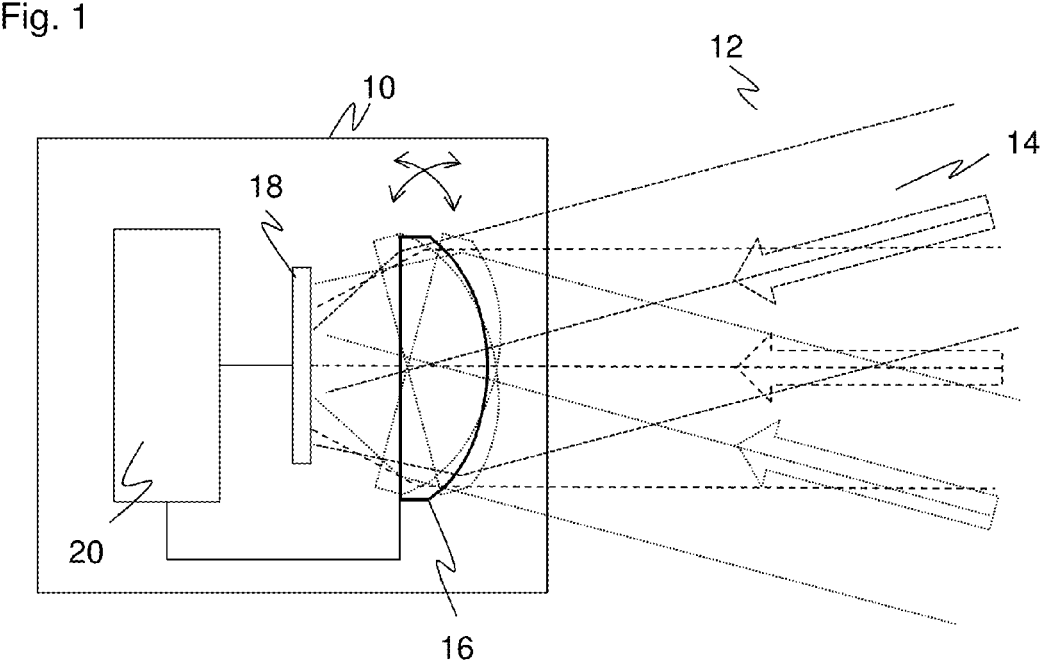

| | | | |
|---|---|---|---|
| 8,213,022 B1 * | 7/2012 | Riza | G01B 11/026 356/495 |
| 2009/0052000 A1 | 2/2009 | Sakata | |
| 2013/0070249 A1 * | 3/2013 | Choi | A61B 5/0066 356/445 |
| 2014/0307252 A1 * | 10/2014 | Hinderling | G01C 15/006 356/141.4 |

FOREIGN PATENT DOCUMENTS

| | | |
|---|---|---|
| DE | 20 2009 012 114 U1 | 3/2011 |
| DE | 20 2012 105 023 U1 | 3/2013 |
| EP | 2071367 A1 | 6/2009 |
| EP | 2 657 881 A1 | 10/2013 |
| WO | 2004/051323 A1 | 6/2004 |

* cited by examiner

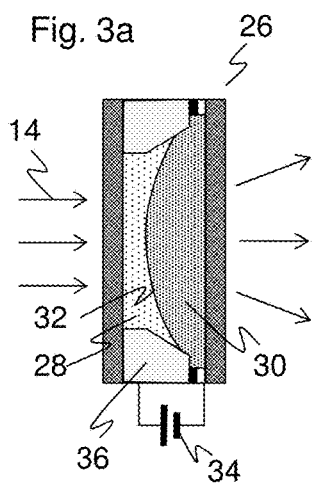
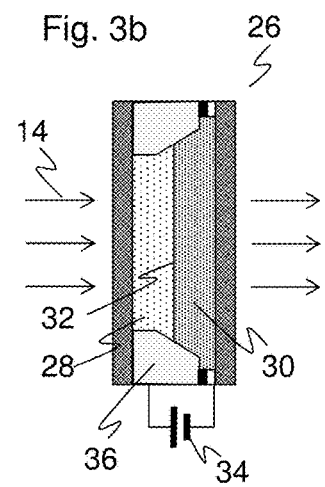
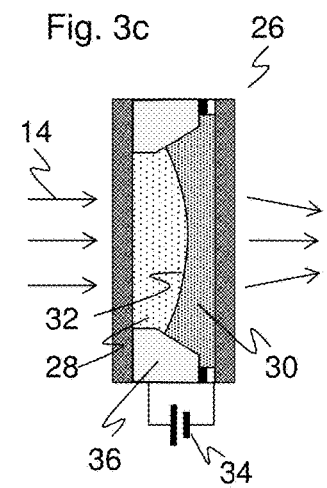
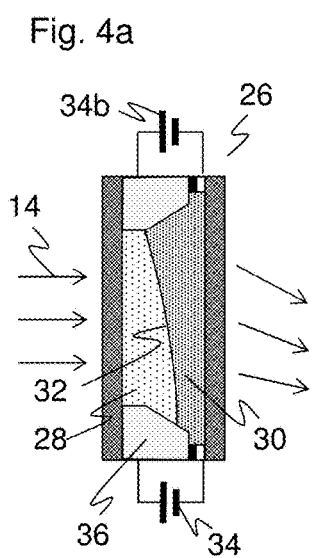
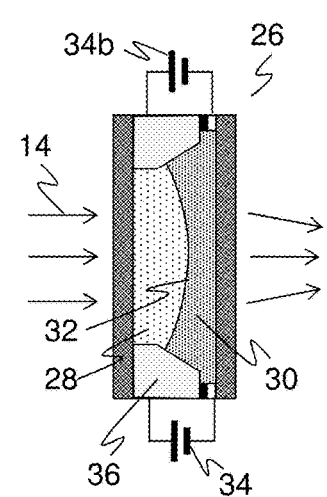
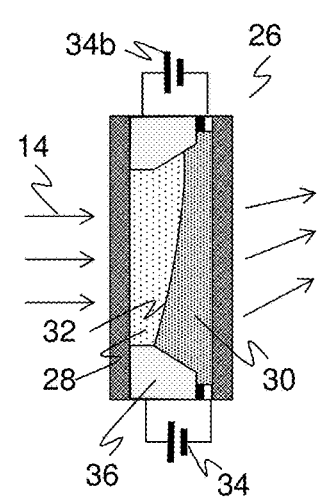
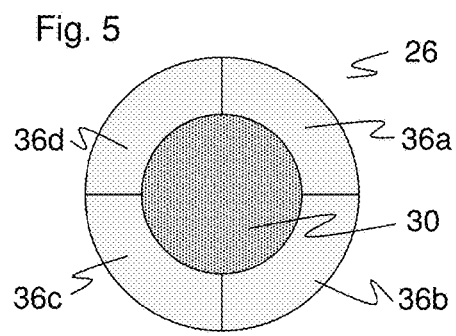

OPTOELECTRONIC APPARATUS AND METHOD FOR THE DETECTION OF OBJECT INFORMATION

The invention relates to an optoelectronic apparatus for the detection of object information from a monitored zone, comprising a light receiver, a receiving optics associated with the light receiver, the receiving optics having an adaptive lens with variable tilt, and an evaluation unit for the generation of object information from a received signal of the light receiver, and to a method for the detection of object information from a monitored zone, in which light is received by a receiving optics and a received signal is generated and evaluated from the light, wherein the receiving optics is aligned with the aid of an adaptive lens by its variable tilt.

Optical sensors use diverse principles in order to detect information in a plurality of dimensions. Image sensors of a camera expanded in two directions have been known for some time. Through different methods for the distance approximation, for example stereoscopy, light section methods or time of flight of light measurements also 3D cameras are enabled.

Rather than detecting the viewing field at the same time in a single taking, like in a camera, scanning systems use movable parts in order to step by step detect a larger viewing region by means of scanning. Examples for this are pivotable camera lines for the detection of a 2D standing image, movable cameras for the capture of a scenery from a plurality of perspectives by means of calculation to 3D images in accordance with the stereoscopic principle, as well as laser scanners. Frequently movable mirror elements are used rather than the direct movement of the sensor. Thus, for example, the scanning of a monitored plane by a laser scanner is typically achieved thereby that the transmission beam is incident at a rotating rotary mirror.

The movable optical components of scanning systems bring about some disadvantages. A high mechanical demand in effort and cost arises in order to enable a reliable and long-lived scanning movement in particular having regard to a gimbaled support in a laser scanner. In an unavoidable manner the wear nevertheless increases the susceptibility to maintenance. The inertness of the movable masses moreover limits the possible scanning pattern.

A transmission optics and/or a receiving optics is provided in nearly every optical sensor. Frequently this optics is set in a focused manner with the aid of a focal adjustment to a certain distance or distance region, in that electromechanically or optomechanically the positions of the lenses and in this way the focal distance of the transmission or receiving optics is adjusted. Such solutions require a large construction space and moreover represent high demands with respect to the mechanical assembly having regard to the precise capability of being set, in such a way that a predefined focal position is actually taken on. An alternative is the use of optics in which not the focal distance, but rather the shape and in this way the focal length of the lens itself is directly varied by means of a voltage control. Gel or liquid lenses are in particular used for this purpose. Having regard to a gel lens, a silicone-like liquid is mechanically deformed by means of piezoelectric or inductive actuators. Liquid lenses for example use the so-called electrowetting effect in that two non-mixable liquids are arranged above one another in a chamber. On the application of a control voltage the two liquids change their surface tension in a different manner in such a way that the inner boundary surfaces of the liquids change their curvature in dependence on voltage. An optoelectronic sensor with focal adjustment on the basis of liquid lenses is known from the DE 10 2005 015 500 A1 or the DE 20 2006 017 268 U1.

In a further design of such liquid lenses for the focal adjustment, the EP 2 071 367 A1 also suggests the variation of the tilt of the liquid lens through the application of different voltages in the circumferential direction. In order to prevent the recording of blurred images, the proper motion of the camera is then determined and one or more lenses in the camera are tilted in order to counteract this proper motion. However, this does not lead to an expansion of the viewing of field of the camera, but rather only to improved images within the predefined viewing field by means of compensation movements, during a single exposure and in this way precisely the opposite of a scanning system is achieved.

In the DE 10 2005 015 500 A1 a further optoelectronic sensor having a liquid lens is disclosed that can be varied asymmetrically in its beam-forming properties by means of an asymmetric frame or different electric potentials at separate electrodes of the lens frame. However, the document then does not explain for what purpose this can be used.

For this reason it is an object of the invention to improve the detection of object information in an apparatus of this kind.

This object is satisfied by an optoelectronic apparatus and by a method for the detection of object information. The apparatus has an adaptive lens that can be brought into different alignments by tilting. The invention is based on the basic idea of bringing the adaptive lens into a plurality of different tilt positions by means of a control with corresponding control signals and to thereby repeatedly realign the apparatus. Thereby received signals are detected from a plurality of different part regions of a scenery. A monitored zone arises that is enlarged in contrast to the original monitored zone having a fixed tilt position and that is scanned by the tilting. The in this respect detected object information is, for example, pixel resolved image data that can be detected by scanning and/or position and/or time resolved bright-dark signals or binary (switching) signals which code the presence or absence of objects can be detected at the same time.

The invention has the advantage that the apparatus is significantly simplified in contrast to known scanning systems. By means of a simple optical and mechanical design, measurement values of the second and third dimension can be generated. The common mechanics demanding in effort and cost having the movable optical parts is replaced by the adaptively tunable lens. The reduced complexity enables a more compact, low-maintenance and cost-effective sensor.

The adaptive lens is preferably also used for a variable focus. In many embodiments the adaptive lens enables this function in such a way that no additional components are required. The variable focus adjusts the apparatus as a whole with respect to a desired depth of field region. It is also plausible to vary the focusing dynamically with the tilt of the adaptive lens.

The adaptive lens is preferably a liquid lens or a gel lens. Such lenses provide the desired possibility of being set and in this respect are very small from a construction point of view and are cost-effective. The tilt of such a lens namely naturally not only necessarily includes a geometric tilt, but rather relates to the optical effect that effectively corresponds to a tilt.

In the circumferential direction the adaptive lens preferably has segmented control elements. Having regard to the control elements these can, for example be segmented electrodes that control a liquid lens via the electrowetting effect. Furthermore, segmented actuators are plausible, in particular piezoactuators that locally vary the pressure on a liquid and thereby curve a membrane on a liquid to a different degree or that directly deform a gel-like substance of the lens. A non-rotationally symmetric influencing of the lens is enabled that leads to the optical tilt through the segmentation in the circumferential direction.

The evaluation unit is preferably configured to bring the adaptive lens into the plurality of tilt positions in accordance with a predefined pattern of movement. The predefined pattern of movement in particular means that this pattern of movement is fixed and is independently determined in advance, this means that it does not dynamically result, for example, from its proper motion in order to compensate this. However, it would also be plausible to additionally take the proper motion into consideration, this means to ensure that the predefined pattern of movement arises as a superposition of the proper motion. The pattern of movement of the tilt movements leads to a path in the scenery along which the current monitored zone is displaced. The pattern of movement is preferably repeated periodically. Examples for a simple periodic pattern of movement are a to and fro movement, a cyclically repeating straight line movement with return or a circular movement. Depending on the application more complex patterns of movement are plausible The apparatus preferably has a light transmitter which is associated with a transmission optics having an adaptive lens with variable tilt. In this way the illumination field of the light transmitter, like the viewing field of the light receiver also carries out a movement through the scenery. Preferably the transmission side tilt and the reception side tilt correspond to one another, at least approximately, such that the illumination field and the viewing field lie on top of one another in the different tilt positions. This can be achieved in that the light transmitter and the light receiver use the same adaptive lens. Alternatively, also separate adaptive lenses with like control are plausible. The light transmitter can be a line-shaped or two-dimensional illumination field, for example, like a flashlight or as a contrast pattern illumination for a light section method or for an active triangulation method. It is likewise plausible to use a point-like illumination, such as a laser diode or an LED whose light is preferably still bunched to a transmission light beam by means of a collimator lens. Then a confined scanning beam arises that scans the scenery like for a laser scanner.

The evaluation unit is preferably configured to determine object distances by determining the time of flight of light between transmission and reception of a light signal. For this purpose pulse-based or phase-based time of flight of light methods are plausible. Depending on the design of the light transmitter a kind of distance measuring laser scanner or a pivotable time of flight of light camera arises, however, thanks to the adaptive lens respectively without movable mechanical parts, such as pivot or rotary mirrors.

The evaluation unit is preferably configured for the reading of code information from the object information. The apparatus in this way becomes a code reader, in particular a kind of barcode scanner without movable parts.

The apparatus is preferably a camera with enlarged monitored zone and its evaluation unit is configured for the stitching of an image from the object information recorded in the different tilt positions. The camera is even more preferably used as a camera-based code reader. If the light receiver is a simple photodiode, then through tilt positions along a straight line a camera line arises and through two-dimensional tilt movements even the recording of planar 2D images is possible. A different embodiment uses a line sensor as a light receiver and then the tilt movement of the adaptive lens ensures a pivot transverse to the line direction and in this way the recording of 2D images. Finally also a matrix sensor can be pivoted in order to expand the viewing field. The stitching of an image from the successively recorded object information in the simplest case merely comprises the storage of the respective sections of the image such that one can subsequently access the image regions detected at different points in time. However, also an intelligent stitching to a larger image on a consideration of image information in overlap regions and/or the respective tilt positions or respectively the utilization of redundant image information in overlapping part regions recorded a plurality of times for obtaining a larger image focus or the like is possible.

The evaluation unit is preferably configured for the generation of three-dimensional images in accordance with the stereoscopic principle from at least two recordings in different tilt positions. Typically two images have to be recorded from different perspectives for stereoscopic recordings which means a doubling up of the camera units and a relatively large assembly. Alternatively, a camera is moved and the images on which the stereoscopic evaluation is based, are recorded one after the other. With the aid of the adaptive lens the perspective can be changed without a larger demand from an apparatus point of view and in this way a three-dimensional image can be recorded.

The method in accordance with the invention can be configured in a similar manner by means of further features and in this respect shows similar advantages. Such further features are described by way of example, but not conclusively in the dependent claims adjoining the independent claims.

Figure 2:
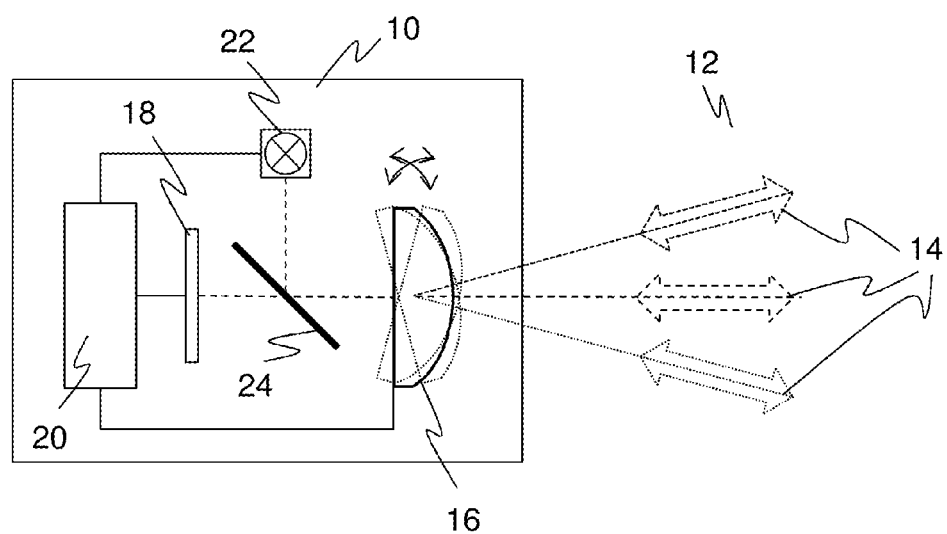

The invention will be described in the following also with regard to further advantages and features with reference to the submitted drawing by means of embodiments. The Figures of the drawing show in:

FIG. 1 a schematic sectional illustration of an optoelectronic sensor having a tiltable adaptive lens;

FIG. 2 a further embodiment of an optoelectronic sensor with an additional light transmitter;

FIG. 3a an illustration of an adaptive lens in a beam expanding setting;

FIG. 3b an illustration of an adaptive lens in a neutral setting;

FIG. 3c an illustration of the adaptive lens in a beam bunching setting;

FIG. 4a an illustration of the adaptive lens with tilt downwardly;

FIG. 4b an illustration of the adaptive lens without tilt;

FIG. 4c an illustration of the adaptive lens with tilt upwardly; and

FIG. 5 a top view onto the adaptive lens for the illustration of a segmented non-rotationally symmetric control.

FIG. 1 shows a schematic sectional illustration of an optoelectronic apparatus 10 for the detection of object information from a monitored zone 12. Light 14 from the monitored zone 12 is guided from a receiving optics 16 to a light receiver 18 that generates an electronic received signal from the light 14. This received signal is forwarded to an evaluation unit 20.

The receiving optics 16 has an adaptive lens that can be tilted by an electronic control of the evaluation unit 20. Depending on the tilt position the apparatus 10 detects a different part region and thus in a superposition of the different part regions a larger monitored zone 12. Three exemplary tilt positions are illustrated in FIG. 1 by means of different dotted lines. A non-illustrated additional or alternative tilt perpendicular to the plane of the paper is likewise plausible. The functional principle of the adaptive lens of the receiving optics 16 will be described in the following in detail with reference to the FIGS. 3 to 5.

FIG. 2 shows a further embodiment of the optoelectronic apparatus 10 having an additional light transmitter 22. For better clarity only the main beams of the light 14 are illustrated. With the aid of a beam splitter 24 an auto-collimation arrangement of the light receiver 18 and the light transmitter 22 is achieved. For this reason the tiltable receiving optics 16 also affects the transmission light, the receiving optics 16 in this example becomes a common transmission/receiving optics. The arrangement having a beam splitter 24 is only an example. Also other optical arrangements, such as a double lens or a biaxial arrangement, are possible. Sometimes it is then advantageous to use a further adaptive lens in such a way that a tilt possibility for the transmission and reception path is respectively created. On the other hand, both adaptive lenses are then preferably synchronously controlled and controlled at the same time such that the respective alignment of the apparatus 10 in the transmission and reception direction is in conformity. Moreover, additional optical elements, such as rigid lenses, for example for the transmission beam collimation, apertures and the like are provided in different embodiments.

The FIGS. 1 and 2 are principle illustrations that are representative for a plethora of sensors. The sensors differ from one another in their light transmitters 22, light receivers 18, tilt movements and evaluations in the evaluation unit 20; however, not therein that object information is detected in a plurality of tilt positions. Thereby a sequential scanning is made possible.

All in all a group of sensors can be referred to as cameras. These cameras can be assembled both passively, in accordance with FIG. 1, as well as actively, in accordance with FIG. 2, this means they can have an own illumination. If the light receiver 18 is configured as a line image sensor, then a 2D standing image is thus recorded by a pivot by means of the adaptive lens of the receiving optics 16. By means of a matrix image sensor as a light receiver 18 a lateral displacement of the optical focal point is obtained by the tilt. Thereby a plurality of images arranged next to one another are recorded from different part regions with more or less mutual overlap which can then be stitched to an overall image in the evaluation unit 20 by means of image evaluation. Moreover, a 3D surface profile can be calculated on the basis of stereoscopy.

By means of a point-like light transmitter 22, for example a laser diode or an LED and a simple light receiver 18, such as a photodiode or an APD, a scanner arises, in an arrangement in accordance with FIG. 2, having a bunched scanning beam that works similar to a laser scanner or a barcode scanner that, however, dispenses with movable mechanical parts, such as a rotary mirror. Preferably, the evaluation unit 20 using a known phase averaging method, individual pulse averaging method or pulse averaging method determines a time of flight of light in this case. From this the distance to the respectively scanned object can be calculated. The current tilt angle is known, as the evaluation unit specifically controls the tilt angle. Thus, an object profile is generated in polar coordinates in the course of the tilt movement. A simple to and fro change of the tilt angle emulates a pivot mirror. More complex patterns of movement are, however, likewise possible.

In this way, a plurality of applications for the inspection and the measurement of objects result. A barcode scanner or a camera-based code reader arises through the use of a known signal or image processing for the reading of codes. Finally, it would even be plausible to omit the light receiver 18 and to only guide the transmission light through the adaptive lens, then solely functioning as the transmission optics. In this way light patterns can be generated, for example, as a movable laser pointer.

The FIGS. 3 and 4 show the adaptive lens of the receiving optics 16 in an exemplary embodiment as a liquid lens 26 in accordance with the electrowetting effect. The functional principle is explained with reference to this liquid lens 26, however, the invention also comprises different kinds of adaptive lenses, for example such having a liquid chamber and a membrane covering this whose curvature is changed by means of a pressure on the liquid or lenses having a gel-like optically permeable material that is mechanically deformed by means of an actuator mechanism.

The actively tunable liquid lens 26 has two transparent non-mixable liquids 28, 30 having different refractive indices and like density. The shape of the liquid—liquid boundary layer 32 between the two liquids 28, 30 is used for the optical function. The actuation is based on the principle of electrowetting which shows a dependency on the surface tension or boundary layer tension on the applied electric field. For this reason, it is possible to change the shape of the boundary layer 32 and in this way the optical properties of the liquid layers 26 by means of an electronic control at a connection 34, whereby corresponding voltages are present at an electrode 36.

FIG. 3 initially shows the change of the focus properties of the liquid lens 26 known for some time. In FIG. 3a incident light is scattered at a concave boundary layer 32. FIG. 3b shows a neutral setting with a flat boundary layer 32, whereas in FIG. 3c the boundary layer is convex and in this way the incident light is bunched. It is clear that a behavior of the refractive indices can be stepped more smoothly and that, for example, a focal length can be set through corresponding intermediate settings.

The liquid lens 26 can also be influenced in its tilt. This is illustrated in FIG. 4 and is based on the non-rotationally symmetrically applied voltages and in this way on electric fields. Correspondingly, the boundary layer 32 is non-rotationally symmetrically deformed which is utilized for the tilt. FIG. 4a shows a tilt of the liquid lens 26 downwardly, FIG. 4b shows a rotationally symmetric setting without tilt for the purpose of comparison and FIG. 4c shows a tilt of the liquid lens 26 upwardly. In this respect the direction of the tilt respectively corresponds to the optical effect, this means from which direction light 14 is received or in which direction transmission light is respectively transmitted. The tilt can respectively be superimposed with a focus.

FIG. 5 shows a top view onto the liquid lens 26 in order to once more explain the non-rotationally symmetric control. For this purpose, the electrode 36 is namely segmented. For a control of the segments, in this example four segments 36a-d, at least one additional connection 34b, shown in FIG. 4, can be required. Through the application of different voltages at the segments 36a-d the boundary layer 32 is deformed in a non-rotationally symmetric manner and for this reason also a tilt of the lens shape can be set besides the focal length.

What is claimed is:

1. An optoelectronic apparatus for the detection of object information from a monitored zone, comprising a light receiver, a receiving optics associated with the light receiver, the receiving optics having an adaptive lens with variable tilt, and an evaluation unit for the generation of object information from a received signal of the light receiver,
   wherein the evaluation unit is configured to bring the adaptive lens into a plurality of different tilt positions and to thereby obtain additional object information from an enlarged monitored zone, and
   wherein the evaluation unit is configured for the generation of three-dimensional images in accordance with the stereoscopic principle from at least two recordings in different tilt positions.

2. The apparatus in accordance with claim 1, wherein the adaptive lens is a liquid lens or a gel lens.

3. The apparatus in accordance with claim 1, wherein the adaptive lens in the circumferential direction has segmented control elements.

4. The apparatus in accordance with claim 1,
   wherein the evaluation unit is configured to bring the adaptive lens into the plurality of tilt positions in accordance with a predefined pattern of movement.

5. The apparatus in accordance with claim 1, that has a light transmitter which is associated with a transmission optics having an adaptive lens with variable tilt.

6. The apparatus in accordance with claim 1,
   wherein the evaluation unit is configured to determine object distances by determining the time of flight of light between transmission and reception of a light signal.

7. The apparatus in accordance with claim 1,
   wherein the evaluation unit is configured for the reading of code information from the object information.

8. The apparatus in accordance with claim 1,
   that is a camera with an enlarged monitored zone and whose evaluation unit is configured for the stitching of an image from the object information recorded in the different tilt positions.

9. A method for the detection of object information from a monitored zone, in which light is received by a receiving optics and a received signal is generated and evaluated from the light, wherein the receiving optics is aligned with the aid of an adaptive lens by its variable tilt,
   wherein the adaptive lens can be brought into a plurality of different tilt positions and a received signal is respectively generated in the tilt positions in order to thereby obtain additional object information from an enlarged monitored zone, and
   wherein the evaluation unit is configured for the generation of three-dimensional images in accordance with the stereoscopic principle from at least two recordings in different tilt positions.

* * * * *